(12) United States Patent
Nishikawa et al.

(10) Patent No.: US 9,539,649 B2
(45) Date of Patent: Jan. 10, 2017

(54) POWER TOOL AND METHOD FOR PRODUCING THE SAME

(75) Inventors: Tomomasa Nishikawa, Hitachinaka (JP); Tetsuhiro Harada, Hitachinaka (JP); Hiroki Uchida, Hitachinaka (JP); Yoshihiro Nakano, Hitachinaka (JP); Hiroki Tsunoda, Hitachinaka (JP); Katsuaki Sukegawa, Hitachinaka (JP); Kazuhiko Morita, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 387 days.

(21) Appl. No.: 14/125,728

(22) PCT Filed: Aug. 10, 2012

(86) PCT No.: PCT/JP2012/005103
§ 371 (c)(1),
(2), (4) Date: Dec. 12, 2013

(87) PCT Pub. No.: WO2013/027365
PCT Pub. Date: Feb. 28, 2013

(65) Prior Publication Data
US 2014/0209341 A1   Jul. 31, 2014

(30) Foreign Application Priority Data
Aug. 19, 2011   (JP) .................. 2011-179827

(51) Int. Cl.
*B23B 45/02*   (2006.01)
*B25F 5/00*   (2006.01)
(Continued)

(52) U.S. Cl.
CPC .............. *B23B 45/02* (2013.01); *B25F 5/008* (2013.01); *H02K 3/522* (2013.01); *H02K 11/33* (2016.01);
(Continued)

(58) Field of Classification Search
CPC .................... B27C 5/00; H05K 7/20
(Continued)

(56) References Cited

U.S. PATENT DOCUMENTS 7,696,667 B2   4/2010   Tatebe
8,405,260 B2   3/2013   Takeyama et al.
(Continued)

FOREIGN PATENT DOCUMENTS

CN   1952379 A   4/2007
CN   101530994 A   9/2009
(Continued)

OTHER PUBLICATIONS

Japan Patent Office office action for patent application JP2011-179827 (Nov. 10, 2014).
(Continued)

*Primary Examiner* — Nathaniel Chukwurah
(74) *Attorney, Agent, or Firm* — Kilpatrick Townsend & Stockton LLP

(57) ABSTRACT

A power tool (1) and a method of producing such power tool capable of improving dust proof performance with respect to a circuit board (33) and a stator coil (31B), and capable of securing cooling performance to the circuit board. The power tool includes a brushless motor (3) having a hollow stator (31), a rotor (32) positioned in an internal space of the stator, and a motor driver circuit connected to the stator. The stator includes a coil (31B) electrically connected to the motor driver circuit. The coil is coated with a coating agent (31D), and the motor driver circuit is covered with an insulation cover member (33D).

9 Claims, 5 Drawing Sheets

(51) Int. Cl.
  *H02K 3/52* (2006.01)
  *H02K 15/00* (2006.01)
  *H02K 15/12* (2006.01)

(52) U.S. Cl.
  CPC ........... *H02K 15/0056* (2013.01); *H02K 15/12* (2013.01); *Y10T 29/49009* (2015.01)

(58) Field of Classification Search
  USPC .................. 173/1, 2, 4, 217; 310/50, 47
  See application file for complete search history.

(56) References Cited

U.S. PATENT DOCUMENTS

| | | | |
|---|---|---|---|
| 8,513,838 | B2 | 8/2013 | Toukairin et al. |
| 2006/0261689 | A1* | 11/2006 | Natsuhara ............... H02K 5/15 310/64 |
| 2007/0086905 | A1 | 4/2007 | Nagata et al. |
| 2007/0114878 | A1 | 5/2007 | Tatebe |
| 2009/0229957 | A1 | 9/2009 | Nishimiya et al. |
| 2009/0302695 | A1 | 12/2009 | Kawamura et al. |
| 2010/0283332 | A1 | 11/2010 | Toukairin et al. |
| 2011/0068642 | A1* | 3/2011 | Takeyama ............... B25F 5/008 310/50 |
| 2011/0227430 | A1 | 9/2011 | Omori et al. |
| 2013/0119792 | A1 | 5/2013 | Nishimiya et al. |

FOREIGN PATENT DOCUMENTS

| | | |
|---|---|---|
| CN | 102019611 A | 4/2011 |
| DE | 102006035354 | 4/2007 |
| EP | 0503868 A1 | 9/1992 |
| EP | 2100702 A1 | 9/2009 |
| EP | 2298503 A2 | 9/2010 |
| JP | 02-136046 A | 5/1990 |
| JP | 2005-48100 A | 2/2005 |
| JP | 2007-82366 A | 3/2007 |
| JP | 2007-116767 A | 5/2007 |
| JP | 2007-124458 A | 5/2007 |
| JP | 2007-143324 A | 6/2007 |
| JP | 2009-214260 A | 9/2009 |
| JP | 2010-023197 A | 2/2010 |
| JP | 2010-69598 A | 4/2010 |
| JP | 2010-81744 A | 4/2010 |
| JP | 2010-99823 A | 5/2010 |
| JP | 2010-238929 A | 10/2010 |
| JP | 2010-260152 A | 11/2010 |
| JP | 2010-264534 A | 11/2010 |
| JP | 2011-062803 A | 3/2011 |
| WO | WO2010/143379 A1 | 12/2010 |

OTHER PUBLICATIONS

Japan Patent Office Decision of Rejection for patent application JP2011-179827 (Mar. 5, 2015).
International Report on Patentability for application PCT/JP2012/005103 (Mar. 6, 2014), 7 pages.
International Search Report for application PCT/JP2012/005103 (Dec. 4, 2012).
China Intellectual Property Office office action for application 201280040283.1 dated Feb. 17, 2015.

* cited by examiner

POWER TOOL AND METHOD FOR PRODUCING THE SAME

TECHNICAL FIELD

The present invention relates to a power tool, and more particularly to such power tool having a brushless motor, and a method for producing the power tool.

BACKGROUND ART

Generally a brushless motor (DC motor) is downsized, and can provide a prolonged service life because electrical connection of a brush and a commutator to a rotor attached to a rotation shaft can be eliminated. The brushless motor is provided with an inverter circuit board (motor driver circuit board) which includes an output transistor as a switching element configured to supply drive signals of large electrical current to a stator coil provided around the rotor.

Japanese Patent Application Publication No. 2011-062803 discloses a structure for protecting an inverter circuit board against rainwater and dust. The protective structure includes a heat radiation member for releasing heat from the switching element. Further, constituents of electronic circuit such as electronic components, coil connecting portion, control circuit portion connecting portion, a circuit board, and the heat radiation member are integrally covered with an insulating cover member by molding.

DISCLOSURE OF INVENTION

Solution to Problem

According to a conventional power tool, cooling to the inverter circuit board and protection against rainwater and dust must be satisfied at the same time. Because the heat radiation member is integrally protected, an entire power tool must become bulky. Further, protection to the stator coil is insufficient because enamel coating and varnish coating over the stator coil are very thin, so that the coating may be peeled off as a result of long period of use in dusty environment. Thus short-circuiting may occur between windings of the stator coil, which may vary characteristic of the motor.

It is therefore an object of the present invention to provide a power tool and a method for producing the power tool capable of improving dust-proof performance for the circuit board and the stator coil, and ensuring cooling performance to the circuit board.

This and other object of the invention will be attained by a power tool including a brushless motor configured to drive an end bit. The brushless motor includes a stator, a rotor, and a circuit board. The stator has a hollow cylindrical shape providing an internal space and is provided with a coil. The rotor is positioned in the internal space. The circuit board is connected to the stator. The coil is electrically connected to the circuit board and the coil is covered with a first resin material. With this structure, the coil can be protected against dust and water droplet, since the coil is covered with the first resin material.

Preferably, the circuit board in its entirety is covered with a second resin material. With this structure, the circuit board can be protected against dust, since the circuit board is covered with the second resin material.

Preferably, the coil is connected to the circuit board such that a part of the first resin material is covered with the second resin material. The coil has a lead out portion electrically connected to the circuit board. With this arrangement, the lead out portion can be covered with the second resin material. Therefore, entire surface of the circuit board and the coil can be covered with at least one of the first resin material and the second resin material. Consequently, electrical current flowing portion in the brushless motor can be covered with the resin.

Preferably, the first resin material is a thermosetting resin or a resin curable upon mixing a base resin with a curative agent.

In another aspect of the invention, there is provided a power tool including a brushless motor configured to drive an end bit, the brushless motor including a stator, a rotor, and a circuit board. The stator has a hollow cylindrical shape providing an internal space. The rotor is positioned in the internal space. The circuit board is connected to the stator and is provided with a plurality of switching elements. The circuit board in its entirety is covered with a resin material. With this arrangement, the circuit board can be protected against dust, since the entire circuit board is covered with the resin material.

Preferably, the resin material has a shape in conformance with a shape of the circuit board. With this arrangement, a thickness of the resin material covering over the circuit board can be thin, to ensure cooling to the circuit board. Further, a combination of the resin material and the circuit board can be compact because of the thin structure of the resin material. Therefore, a spatial tolerance can be increased within a housing of the power tool, thereby facilitating layout of components and mechanical parts such as male thread.

Preferably, the brushless motor further includes a holding member positioned between the stator and the circuit board for connecting the stator to the circuit board. The holding member is formed with at least two openings in communication with the internal space of the stator. With this structure, for forming the resin material over the circuit board in a state where the circuit board is assembled to the stator, the resin material can reach, through the openings, an inside area of the circuit board, the inside area being within an inside of the stator. Thus, entire surface of the circuit board can be covered with the resin material.

Preferably, the resin material is a resin curable upon mixing a base resin with a curative agent, or the resin material is urethane resin.

Preferably, the power tool further includes a housing accommodating therein the brushless motor. A cooling air passage is defined between the housing and the brushless motor, and the circuit board faces the cooling air passage. With this structure, stabilized cooling to the circuit board can be obtained.

In another aspect of the invention, there is provided a method for producing a power tool including a brushless motor configured to drive an end bit, the brushless motor including a stator having a hollow cylindrical shape providing an internal space and provided with a coil having an lead out portion, a rotor positioned in the internal space, and a circuit board electrically connected to the lead out portion, the method including (a) coating the coil with a first resin material, (b) removing the first resin material at an end portion of the lead out portion, (c) electrically connecting the end portion of the lead out portion to the circuit board, and (d) coating the circuit board, the end portion of the lead out portion, and the lead out portion coated with the first resin material with a second resin material. With this method, the coil and the circuit board can be fully covered with at least one of the first resin material and the resin material. Therefore, electrical current flowing portion of the brushless motor can be covered with the resin material.

REFERENCE SIGNS LIST

Figure 1:
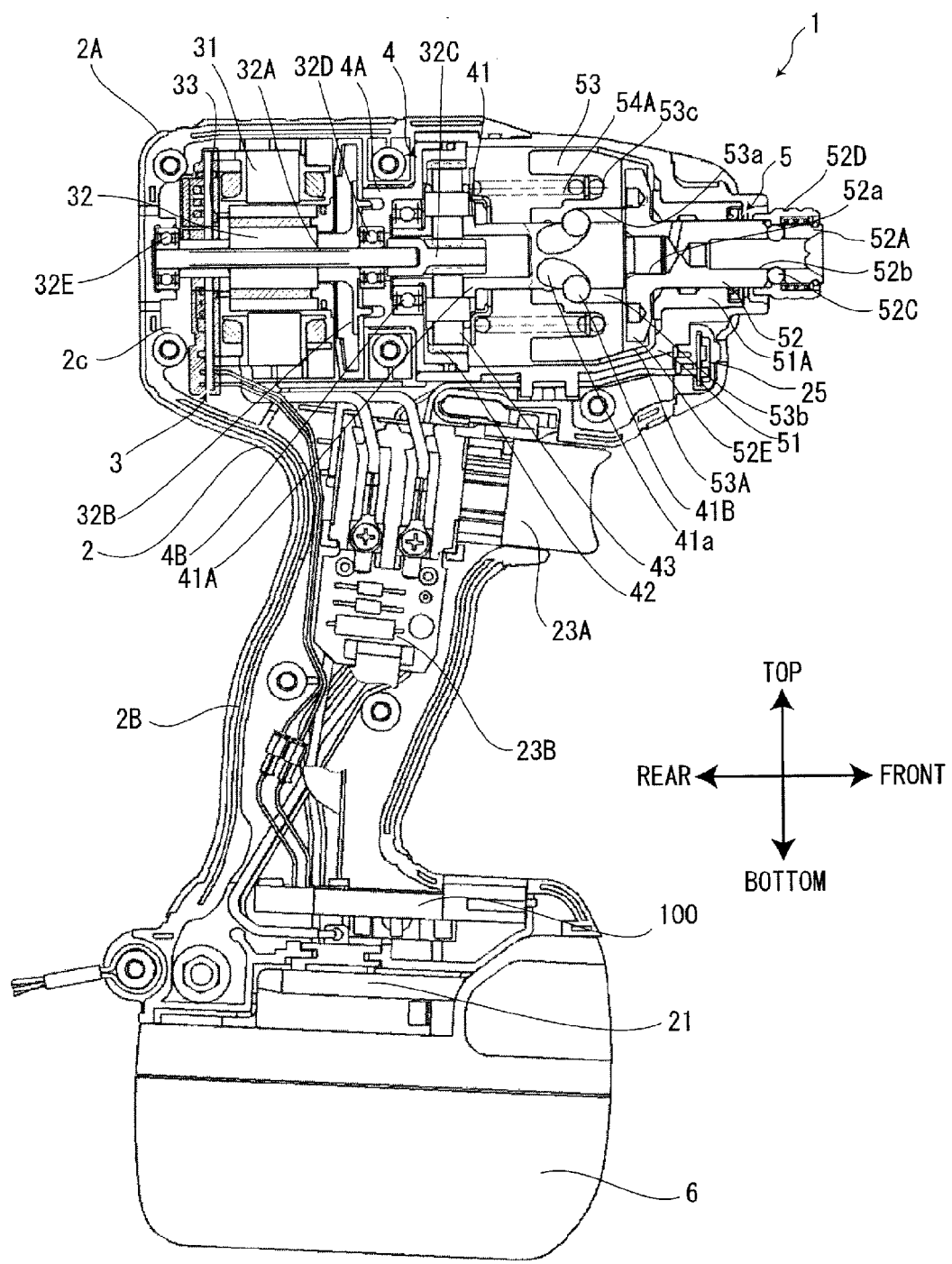
FIG. 1 is a cross-sectional side view of an impact driver according to one embodiment of the present invention.

1: impact driver
2: housing
2A: body portion
2B: handle
2a: intake port
2c: cooling air passage
3: motor
4: gear mechanism
4A: frame body
4B: bearing
5: impact mechanism
6: battery
21: terminal portion
23A: trigger
23B: switching portion
25: light
31: stator
31A: winding portion
31B: coil
31C: lead out portion
31D: coating agent
31a: slot
32: rotor
32A: rotor shaft
32B: fan
32C: pinion gear
32D, 32E: bearing
33: motor driver circuit
33A: large size switching element
33B: small size switching element
33C: solder portion
33D: insulation cover member
33a: through-hole
34: insulator
34a, 34b: opening
41: spindle
41A: flange
41B: ball
41a: groove
42: ring gear 43: planetary gear
51: hammer case
51A: bearing
52: anvil
52A: end bit attachment portion
52C: ball
52D: operation portion
52E blade portion
52a: bore
52b: attachment hole
53: hammer
53A: pawl portion
53a: through-hole
53b: groove
53c: retaining portion
54A: first spring
100: control circuit portion

DESCRIPTION OF EMBODIMENTS

An impact driver as a power tool according to one embodiment of the present invention will be described with reference to FIGS. 1 through 7. FIG. 1 shows the impact driver 1 adapted to fasten a bolt, nut and a male thread, and mainly includes a housing 2, a motor 3, a gear mechanism 4, and an impact mechanism 5. A rechargeable battery 6 is used as a power source for driving the tool.

The housing 2 is made from resin such as 6-nylon. The resin housing 2 includes a body portion 2A in which the motor 3 is accommodated, and a handle 2B extending from the body portion 2A. The housing 2 is provided by two housing sections divided into two symmetrical sections complementary with each other. The two symmetrical sections are mated with each other in a mating plane extending in vertical direction and frontward/rearward direction to provide an accommodation space within the body portion 2A and the handle portion 2B. The above-described motor 3, the gear mechanism 4 and the impact mechanism 5 are arrayed in line coaxially in the accommodation space of the body portion 2A from one end to another end portion of the body portion 2A. A frontward/rearward direction is coincident with the direction of this array in which the side of the motor 3 will be referred to as a rear side. Further, a direction from the body portion 2A to the handle portion 2B will be referred to as vertical direction perpendicular to the frontward/rearward direction. The side of the handle 2B will be referred to as lower side.

In the body portion 2A, a discharge port (not shown) and an intake port 2a (FIG. 2) are formed at each lateral side of the body portion 2A and at positions frontward and rearward of the motor 3. In the housing 2, a terminal portion 21 is provided at a lower end portion of the handle 2B. The battery 6 is detachably attached to the terminal portion 21 and is electrically connected to the terminal portion 21. Further, a control circuit portion 100 is provided above the terminal portion 21 for controlling rotation of the motor 3. The terminal portion 21 is electrically connected to the control circuit portion 100.

The handle 2B has a base end portion provided with a trigger 23A for user's manipulation and a switching portion 23B connected to the trigger 23A and the control circuit portion 100 and adapted to control conduction to the motor 3. Further, a forward-reverse changeover lever (not shown) is provided at the base end portion of the handle 2B and above the trigger 23A for changing rotational direction of the motor 3.

Figure 2:
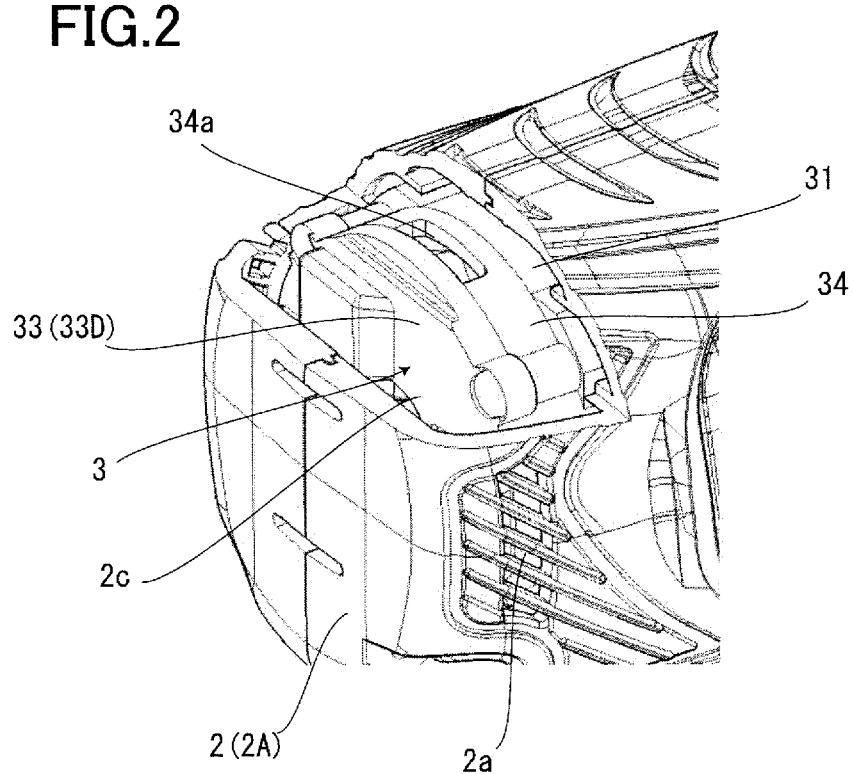
FIG. 2 is a partial perspective view of the impact driver according to the embodiment as viewed from an upper rear side of the impact driver.

An LED light 25 is provided at a front end of the housing 2 and below the impact mechanism 5. The LED light 25 is connected to the control circuit portion 100 and is adapted to irradiate light frontward. Further, as shown in FIGS. 1 and 2, a cooling air passage 2c is formed within the housing 2. The cooling air passage 2c is positioned around the motor 3 and is spanned between the intake port 2a and the discharge port (not shown).

Figure 3:
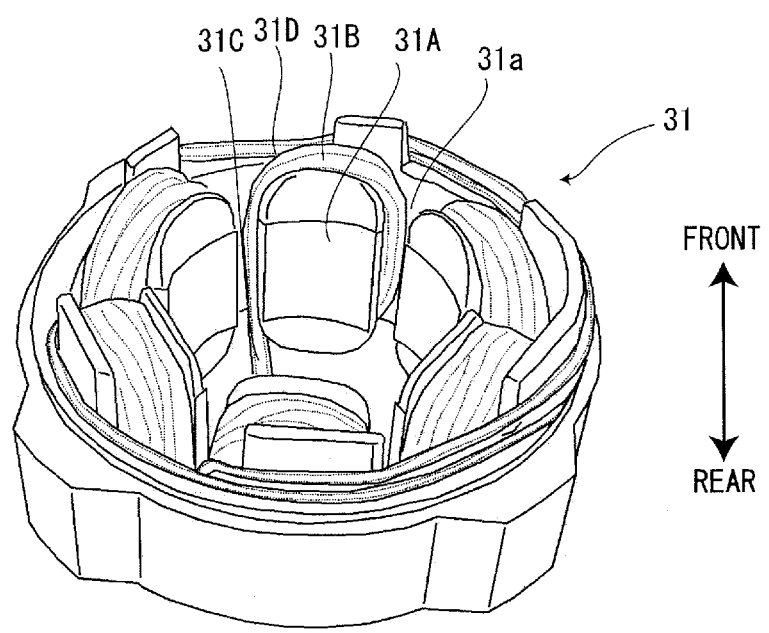
FIG. 3 is a perspective view of a stator in the impact driver according to the embodiment.

The motor 3 is DC brushless motor, and mainly includes a stator 31, a rotor 32 and a motor driver circuit 33. The stator 31 is hollow cylindrical shaped constituting an outer shell of the motor 3, and has an outer peripheral surface held to the hosing 2. As shown in FIG. 3, six slots 31a are formed inside the stator 31. Neighboring slots 31a are spaced away from each other at a constant interval in a circumferential direction of the stator 31, and each slot 31a extends in frontward/rearward direction. Further, a wire winding portion 31A is provided between the neighboring slots 31a and 31a. A coil 31B is provided by winding an insulated conductive wire over the winding portion 31A. A lead out portion 31C extends from the coil 31B. The lead out portion 31C is an end portion of the insulated conductive wire. The coil 31B has an exposed portion. The lead out portion 31C and at least the exposed portion are subjected to coating with a coating agent 31D as a first resin material made from thermoplastic resin.

As shown in FIG. 1, the rotor 32 is rotatably disposed in the stator 31. The rotor 32 has a rotor shaft 32A integral with a rotor body and extending in the frontward/rearward direction. An axis of the rotor shaft 32A defines a rotation axis of the rotor 32. The rotor shaft 32A has a front end portion provided with a fan 32B and a pinion gear 32C, those being coaxially and integrally rotatable with the rotor shaft 32A. Further, the front end portion of the rotor shaft 32A is rotatably supported to a frame body 4A described later through a bearing 32D. The rotor shaft 32A has a rear end portion rotatably supported to the body portion 2A through a bearing 32E.

Thus, the rotor shaft 32A is rotatably supported to the body portion 2A through the bearings 32D, 32E. Upon rotation of the rotor shaft 32A, the fan 32B is rotated integrally with the rotor shaft 32A to generate air flow in which air is introduced through the intake port 2a into the accommodation space of the body portion 2A and is discharged through the discharge port (not shown).

Figure 4:
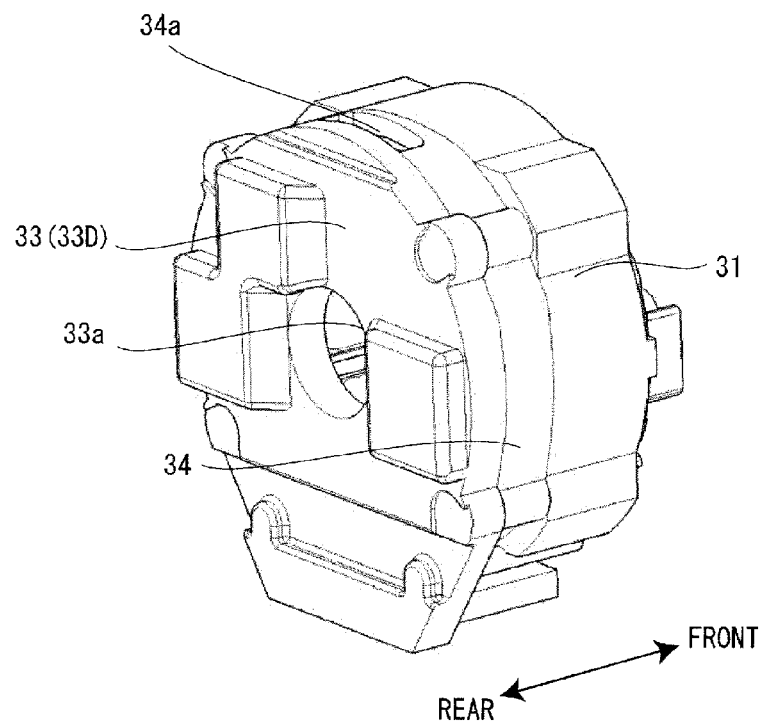
FIG. 4 is a perspective view of the stator and a motor driver circuit device in the impact driver as viewed from an upper rear side of the stator.
Figure 5:
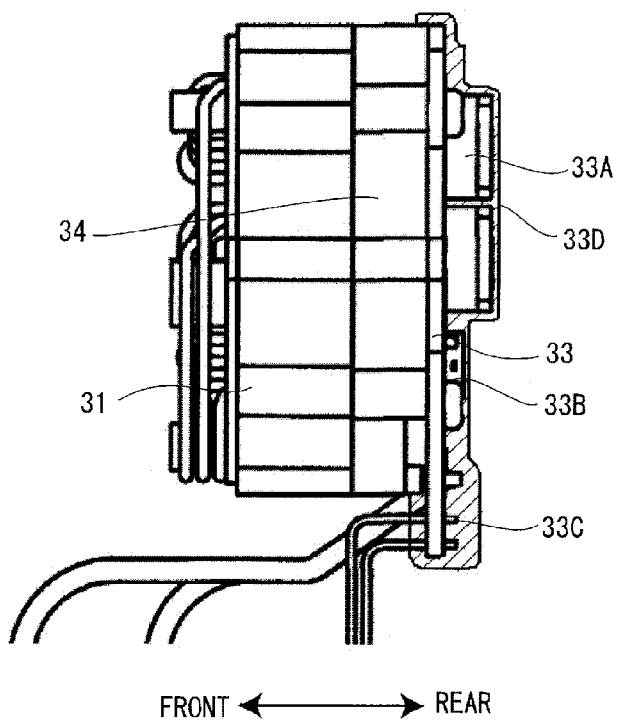
FIG. 5 is a side view, with partially cross-sectioned, of the stator and the motor driver circuit device in the impact driver according to the embodiment.
Figure 6:
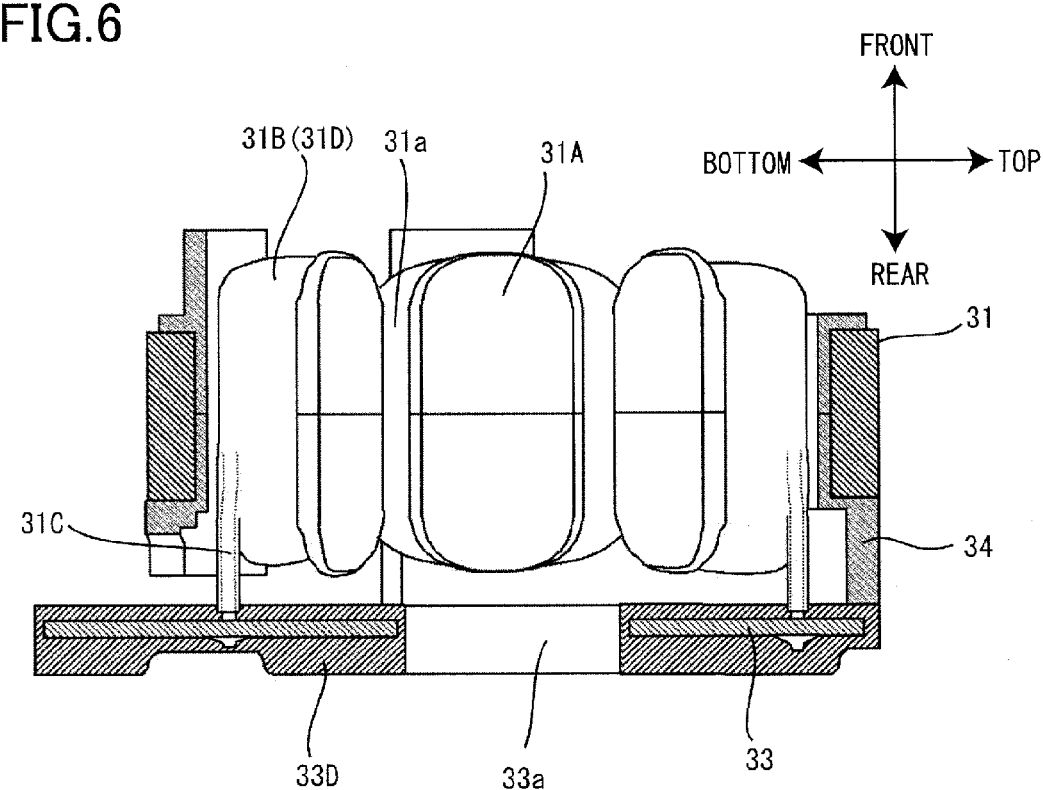
FIG. 6 is a cross-sectional view of the stator and the motor driver circuit device in the impact driver according to the embodiment.

As shown in FIG. 4, the motor driver circuit 33 as a circuit board is flat plate shaped and has a center region formed with a through-hole 33a through which a rear end portion of the rotor shaft 32A extends. As shown in FIG. 5, the motor driver circuit 33 is positioned at a rear side of the stator 31 and extends in a direction perpendicular to the frontward/rearward direction. The motor driver circuit 33 is fixed to the stator 31 through an insulator 34 as a holding member. As shown in FIG. 6, the lead out portion 31C is electrically connected to the motor driver circuit 33 by soldering.

As shown in FIG. 5, a large size switching element 33A, a small size switching element 33B, and a plurality of solder portion 33C protrude rearward from the rear surface of the motor driver circuit 33. The small size switching element 33B has a protruding amount smaller than that of the large size switching element 33A. The solder portion 33C is placed at end portion of the conductive wire connected to the control circuit portion 100.

The motor driver circuit 33 is covered with an insulation cover member 33D as a second resin material which is a curable two-component type resin containing urethane resin as a main component and a curing agent mixed therewith. As shown in FIGS. 5 and 6, the insulation cover member 33D covers the entire motor driver circuit 33. The motor driver circuit 33 has an irregular surface (concave-convex surface) because the circuit 33 has the large size switching element 33A, the small size switching element 33B and the plurality of solder portions 33C. The insulation cover member 33D covers the motor driver circuit 33 in conformance with the surface irregularities thereof. In other words, the insulation cover member 33D has a uniformly thin thickness without any excessively thick region. Further, as shown in FIG. 6, the insulation cover member 33D is configured to overlap with the coating agent 31D protecting the lead out portion 31C connected to the motor driver circuit 33 to cover the coating agent 31D.

Figure 7:
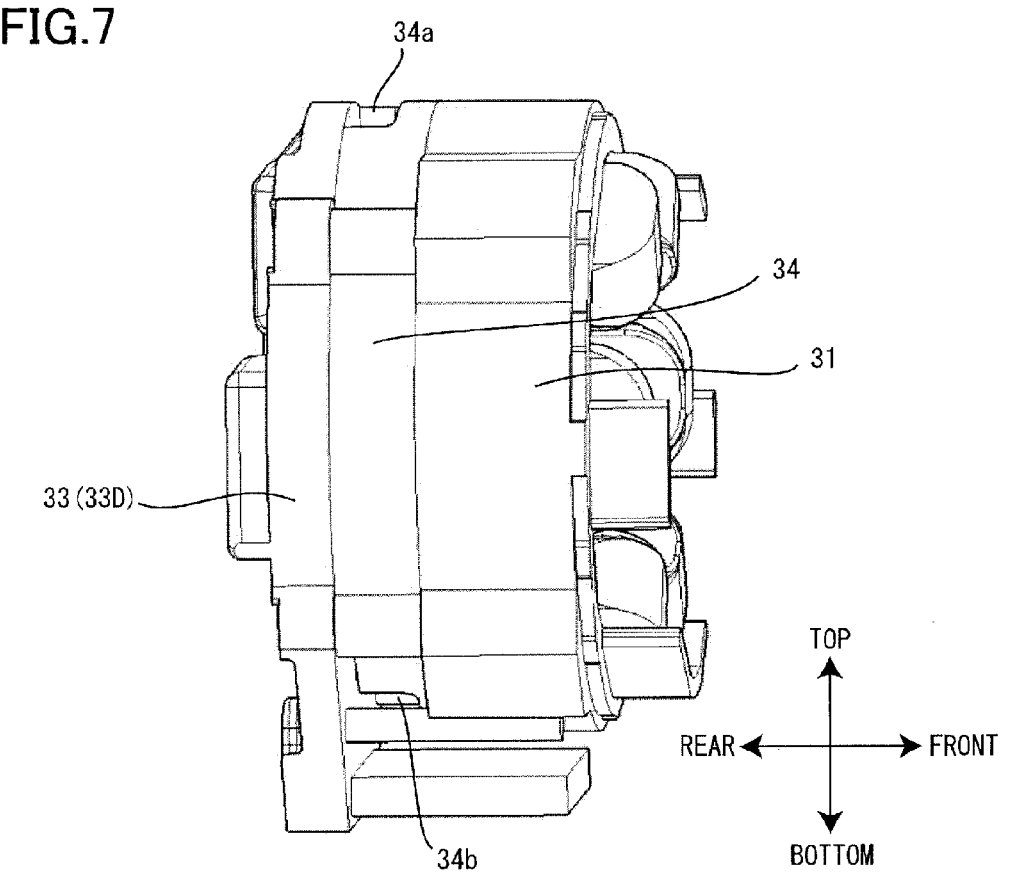
FIG. 7 is a perspective view of the stator and the motor driver circuit device in the impact driver as viewed from a side and front of the stator.

The insulator 34 is tubular shaped and is positioned between the stator 31 and the motor driver circuit 33. As shown in FIGS. 4 and 7, two openings 34a, 34b are formed at a rear end of the insulator 34 and at a position confronting the front surface of the motor driver circuit 33. The openings 34a and 34b are positioned at upper and lower portions of the insulator 34, respectively, and are in communication with an interior of the stator 31 through an interior of the insulator 34. As a modification, more than two openings can be formed in the insulator 34.

Air flow is also generated in the internal space of the stator 31 since the fan 32B is coaxially and integrally rotatable with the rotor 32. Since the rear side of the stator 31 is physically blocked by the motor driver circuit 33, external air will be introduced into the internal space of the stator 31 through the openings 34a, 34b by the air flow generated in the internal space of the stator 31. The openings 34a, 34b are positioned at the front surface of the motor driver circuit 33, and the openings 34a, 34b are positioned in the cooling air passage 2c open to the intake port 2a. Therefore, the external air introduced into the stator 31 is the external air outside of the housing 2 and passing through the cooling air passage 2c via the intake port 2a.

As shown in FIG. 1, the gear mechanism 4 is positioned at a front side of the motor 3 in the body portion 2A. The gear mechanism 4 is a planetary gear mechanism whose sun gear is the pinion gear 32C, and whose outer shell is the frame body 4A supported to the housing 2. The planetary gear mechanism also includes a spindle 41, a ring gear 42, and a plurality of planetary gears 43. The spindle 41 functions as a carrier for supporting the plurality of planetary gears 43. The spindle 41 has a front end portion coaxially and rotatably supporting an anvil 52 (described later), and has a rear end portion rotatably supported to the frame body 4A through a bearing 4B.

A flange 41A is provided at a position adjacent to the rear end portion of the spindle 41 for rotatably supporting the planetary gears 43. Further, a first spring 54A (described later) is seated on the flange 41A. A hammer 53 is axially movably disposed over the spindle 41. The spindle 41 is formed with a pair of grooves 41a, 41a extending diagonally relative to the axial direction. A ball 41B is inserted in each groove 41a so that the spindle 41 and the hammer 53 are connected with each other through the balls 41B.

The ring gar 42 is fixed to the frame body 4A such that the ring gear 41 is positioned at radially outer side and concentrically with the spindle 41. Each planetary gear 43 is rotatably supported to the spindle 41 and is in meshing engagement with the ring gear 42 and the pinion gear 32C. With this structure, rotation of the pinion gear 32C is deceleratingly transmitted to the spindle 41.

As shown in FIG. 1, the impact mechanism 5 includes a hammer case 51, the anvil 52, the hammer 53, and the first spring 54A. The hammer case 51 is hollow cylindridal shaped and has a front end portion diametrically reduced. The hammer case 51 has a rear end portion connected to the body portion 2A and concentric with the motor 3, and has a front end portion provided with a bearing 51A for rotatably supporting the anvil 52.

The anvil 52 is cylindrical shaped extending in the frontward/rearward direction, and is rotatably supported to the hammer case 51 through the bearing 51A. The anvil 52 has a rear end portion formed with a bore 52a with which a front end portion of the spindle 41 is loosely fitted, so that the anvil 52 is rotatably supported to the spindle 41. The anvil 52 has a front end portion formed with an attachment hole 52b and provided with an end bit attachment portion 52A for attaching a socket (not shown).

The end bit attachment portion 52A includes a plurality of balls 52C protrudable into the attachment hole 52b, and an operation portion 52D biased rearward by a spring and abuttable on the balls 52C to push the balls 52C in a direction for permitting the balls 52C to protrude into the attachment hole 52b in the rearwardly biased state. The rear portion of the anvil 52 is integrally provided with a pair of blade portions 52E as engaged portions extending radially outwardly and diametrically opposite sides to each other.

The hammer 53 is cylindrical shaped and is formed with a through-hole 53a through which the spindle 41 extends. The hammer 53 has a front end portion provided with a pair of pawl portions 53A as engagement portions engageable with the blade portions 52E. Each pawl portion 53A protrudes frontward from a front end of the hammer 53, and is angularly spaced away from each other by 180 degrees. The pair of pawl portions 53A are shaped into a rotational symmetry, and each pawl portion 53A has a side surface extending in a direction perpendicular to the circumferential direction of the pawl portion 53A, and the side surface is inclined to make the pawl portion to be taper shaped.

With this structure, when load from the hammer 53 is imparted on the anvil 52, the anvil 52 is urged to be moved frontward relative to the hammer 53 along the side surface, so that the blade portions 52E, 52E ride over or moves past the pawl portions 53A, 53A, thereby permitting the hammer 53 to rotate with respect to the anvil 52. In an actual operation, because the anvil 52 is immovable frontward relative to the housing 2, the hammer 53 is moved rearward relative to the anvil 52, so that the blade portions 52E, 52E move past the pawl portions 53A, 53A, thereby permitting the hammer 53 to rotate with respect to the anvil 52.

The through-hole 53a of the hammer 53 has an inner peripheral surface formed with a pair of grooves 53b, 53b extending in frontward/rearward direction into which the pair of balls 41B are inserted. Since the pair of balls 41B, 41B are inserted into the pair of grooves 53b, 53b of the hammer 53 and into the pair of grooves 41a, 41a of the spindle 41, the hammer 53 and the spindle 41 can be coaxially rotated together. The hammer 53 has a rear end portion provided with a spring retaining portion 53c to which one end portion of the first spring 54A is seated. The spring retaining portion 53c is positioned around a sleeve-like wall that defines the through-hole 53a.

A rear end of the first spring 54A is seated on the flange 41A of the spindle 41 through a washer. A front portion of the spindle 41 frontward of the flange 41A extends through an internal space of the first spring 54A. The front end portion of the first spring 54A is inserted into the spring retaining portion 53c so as to urge the hammer 53 frontward in the axial direction relative to the spindle 41. Thus, urging force of the first spring 54A is in conformance with the axial direction and frontward direction. The pawl portion 53A of the hammer 53 can be engaged with the blade portion 52E of the anvil 52 because of the biasing force of the spring 54A applied to the hammer 53 in the forward direction.

Even if the hammer 53 is moved rearward relative to the anvil 52 during application of the load, the hammer 53 can be moved forward toward the anvil 52 by the biasing force of the first spring 54A at the timing when the blade portion 52E has moved past the pawl portion 53A, so that abutment between the pawl portion 53A and the blade portion 52E can be provided. In this way, impacting force in the rotational direction can be applied to the anvil 52 by the rotation of the hammer 53 relative to the anvil 52 and by the abutment of the blade portion 53A onto the blade portion 52E.

A process for providing the coating agent 31D and the insulation cover member 33D to the motor 3 will next be described for the production of the above-described impact driver 1. First, coil coating process is performed. That is, in the stator 31, the insulated wire is wound over the winding portion 31A to provide the coil 31B. In this state, slurry containing a powdered thermosetting resin is coated over the stator 31 including the coil 31B and the lead out portion 31C, and then, the coil 31B and the lead out portion 31C is energized. As a result of energization, the coil 31B and the lead out portion 31C produce a heat, so that melting occurs only the thermosetting resin adhered onto the coil 31B and the lead out portion 31C.

Then, thermosetting resin adhered onto a portion other than the coil 31B and the lead out portion 31C is removed, and the coil 31B and the lead out portion 31C is again energized at an output higher than that of the first energization. Upon energization, curing occurs in the thermosetting resin adhered onto the coil 31B and the lead out portion 31C, to thereby forming the coating agent 31D Next, lead out portion peel off process will be performed. In this process, the coating agent 31D and an insulation coating formed over the conductive wire at an end portion of the lead out portion 31C is removed or peeled off.

Then, connection process is performed. In this process, the motor driver circuit 33 is assembled to the stator 31 through the insulator 34, and during this assembly an exposed or bare wire at the end portion of the lead out portion 31C is electrically connected to a pattern on the motor driver circuit 33 by soldering. By this soldering, other conductive wires constituting the solder portion 33C are also electrically connected to the pattern.

Next, a process of coating the circuit board will be performed. First, the motor driver circuit 33 and the insulator 34 assembled thereto are positioned within a frame body (not shown) in a state that the insulator 34 and the motor driver circuit 33 are vertically arranged in this order, and a liquidized resin containing a mixture of base resin and a curative agent is flowed into the frame body. The frame body has an internal configuration in conformance with an outer configuration of the insulation cover member 33D. Since the insulator 34 is assembled to an upper surface (front side surface in FIG. 7) of the motor driver circuit 33, the liquidized resin may not sufficiently reach the upper surface of the motor driver circuit 33. However, since the openings 34a, 34a are formed in the insulator 34, the openings 34a, 34a can allow the liquidized resin to pass therethrough, so that the resin can reach the upper surface of the motor driver circuit 33, a part of the upper surface being positioned inside the insulator 34. Thus, an entire peripheral surface of the motor driver circuit 33 can be covered with the resin.

In the resin flowing state, the connecting portion between the lead out portion 31C and the motor driver circuit 33, and a portion adjacent to the connecting portion are also covered with the resin. In the lead out portion 31C, a portion other than the connecting portion connected to the motor driver circuit 33 is coated by the coating agent 31D. Therefore, the portion coated by the coating agent 31D is also covered with the liquidized resin. The insulation cover member 33D can be formed upon curing the resin. Thus, the motor 3 can be protected by the coating agent 31D and the insulation cover member 33D.

According to the above-described impact driver 1, any damage to the coil 31B and the motor driver circuit 33 can be restrained even if foreign material such as water droplet and dust is entered into the housing 2, since the coil 31B which is an electrically connecting portion and the motor driver circuit 33 are covered with the coating agent 31D and the insulation cover member 33D. Thus, change in characteristic of the motor due to short-circuit at the coil 31B and the motor driver circuit 33 can be restrained.

Further, since the motor driver circuit 33 faces the cooling air passage 2c, cooling to the motor driver circuit 33 can be effectively performed by introducing an external air into the motor 3 by the rotation of the fan 32B. In particular, the insulation cover member 33D does not affect cooling to the motor driver circuit 33, because the insulation cover member 33D is configured to be sufficiently thin conforming with the outer profile of the motor driver circuit 33. Further, the thin structure of the insulation cover member 33D can make the entire device compact. Therefore, spatial allowance within the housing 2 can be increased, which facilitates layout of components and mechanical parts required in the impact driver 1.

Further, each intake port 2a for introducing external air into the housing 2 are positioned at each lateral side of the housing 2, whereas openings 34a, 34b for introducing external air into the motor 3 are respectively positioned at upper and lower sides of the insulator 34. With this arrangement, any foreign materials introduced into the housing 2 through the intake port 2a cannot reach to the openings 34a, 34b. Thus, accidental locking of the rotation of the motor 3 due to the foreign materials can be restrained.

Further, according to the above-described production method, secure resin coating can be performed with respect to the coil 31B, the motor driver circuit 33, and the connecting portion therebetween. In particular, thermosetting resin is used for coating the coil 31B. Therefore, an entire surface of the coil wound over the winding portion 31A and exposed to the outside can be covered with the resin, and the lead out portion 31C extending from the coil 31B can also be covered with the resin.

Further, the resin which is a mixture of the base resin and the curative agent is used for coating the motor driver circuit 33. This resin will be cured after elapse of predetermined time period from the timing of mixing the base resin with the curative agent. In other words, the resin can maintain its fluidity for the predetermined time period. Therefore, complicated irregular shape of the insulation cover member 33D can be formed. Further, because of this fluidity, the resin can surely cover the motor driver circuit 33 in its entirety, because the resin can be easily entered into the interior of the insulator 34 through the openings 34a, 34b. Further, the insulation cover member 33D is made from urethane resin. Therefore, the insulation cover member 33D can be produced at a low cost.

The power tool according to the present invention is not limited to the impact driver, but is available for any type of power tool provided with the brushless motor.

While the invention has been described in detail and with reference to the specific embodiments thereof, it would be apparent to those skilled in the art that various changes and modifications may be made therein without departing from the spirit and scope of the invention.

The invention claimed is:

1. A power tool including a brushless motor configured to drive an end bit, the brushless motor comprising:
    a stator having a hollow cylindrical shape providing an internal space and provided with a coil;
    a rotor positioned in the internal space; and
    a circuit board connected to the stator, the coil being electrically connected to the circuit board, wherein:
        the coil is covered with a first resin material,
        the circuit board in its entirety is covered with a second resin material, and
        the coil is connected to the circuit board such that a part of the first resin material is covered with the second resin material.

2. The power tool as claimed in claim 1, wherein the first resin material comprises a thermosetting resin.

3. The power tool as claimed in claim 1, wherein the first resin material comprises a resin curable upon mixing a base resin with a curative agent.

4. The power tool as claimed in claim 1, wherein the second resin material has a shape in conformance with a shape of the circuit board.

5. The power tool as claimed in claim 1, wherein the brushless motor further comprises a holding member positioned between the stator and the circuit board for connecting the stator to the circuit board, the holding member being formed with at least two openings in communication with the internal space of the stator.

6. The power tool as claimed in claim 1, wherein the second resin material comprises a resin curable upon mixing a base resin with a curative agent.

7. The power tool as claimed in claim 6, wherein the second resin material comprises a urethane resin.

8. The power tool as claimed in claim 1, further comprising a housing accommodating therein the brushless motor, a cooling air passage being defined between the housing and the brushless motor, and the circuit board facing the cooling air passage.

9. A power tool comprising:
    a brushless motor configured to drive an end bit, the brushless motor comprising a stator and a rotor, the stator having a hollow cylindrical shape providing an internal space, the stator being provided with a coil, and the rotor being positioned in the internal space; and
    a circuit board electrically-connected to the coil, wherein the coil is covered with a first resin material, and
    the circuit board in its entirety is covered with a second resin material, and wherein
    the coil is connected to the circuit board such that a part of the first resin material is covered with the second resin material.

* * * * *